May 7, 1963  W. A. ROSS ETAL  3,088,546
AUTOMATIC SAFETY LEG
Filed July 24, 1961  2 Sheets-Sheet 1
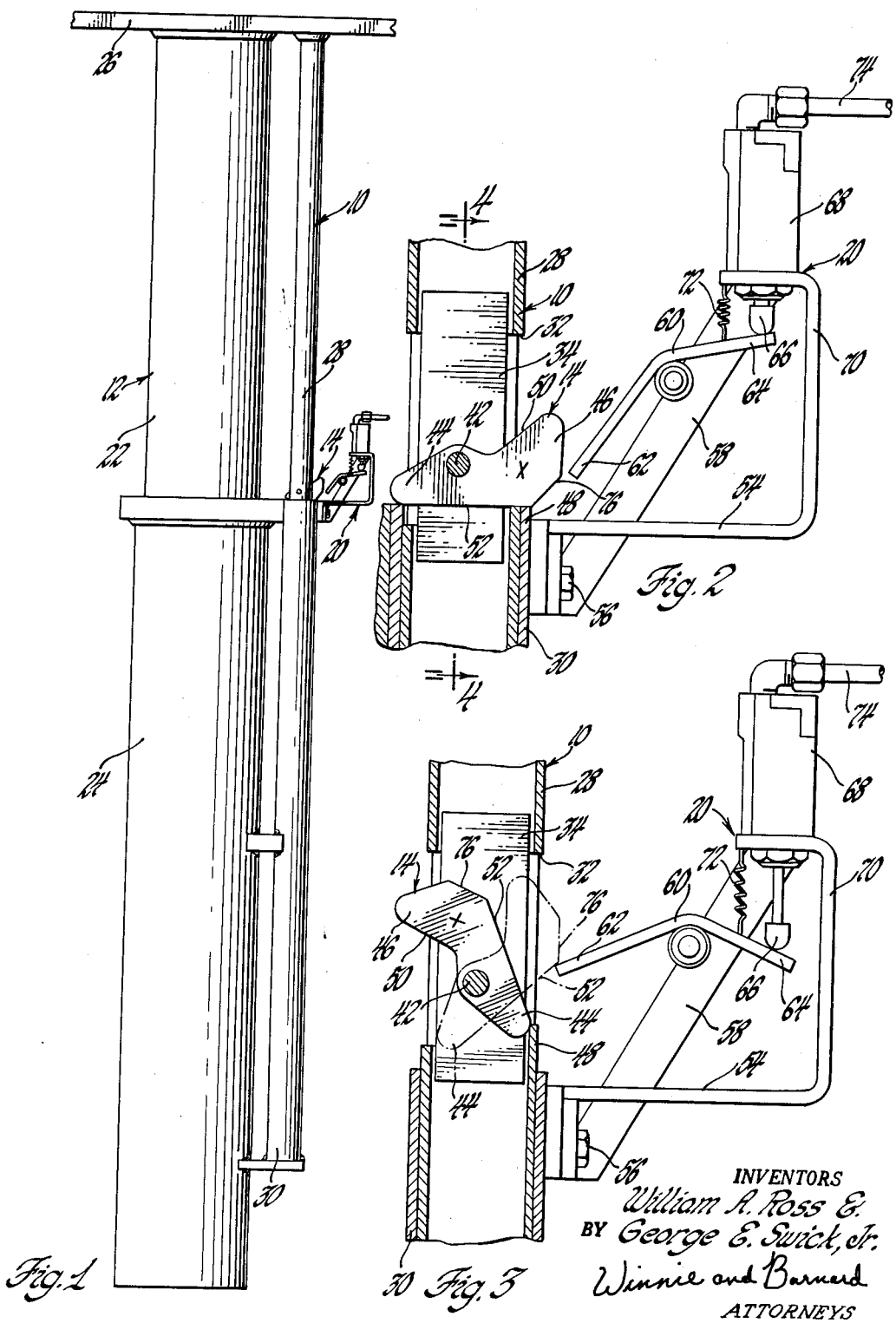
INVENTORS
William A. Ross &
BY George E. Swick, Jr.
Winnie and Barnard
ATTORNEYS May 7, 1963   W. A. ROSS ETAL   3,088,546
AUTOMATIC SAFETY LEG Filed July 24, 1961   2 Sheets-Sheet 2

INVENTORS
William A. Ross &
BY George E. Swick, Jr.
Winnie and Barnard
ATTORNEYS United States Patent Office 3,088,546
Patented May 7, 1963

3,088,546
AUTOMATIC SAFETY LEG
William A. Ross and George E. Swick, Jr., Springfield, Ill., assignors to Dura Corporation, Oak Park, Mich., a corporation of Michigan
Filed July 24, 1961, Ser. No. 126,255
2 Claims. (Cl. 187—8.49)

This invention relates to automatic safety legs for use with vehicle lifts and for other purposes.

Hydraulic lifts which are used to raist automobiles, trucks and other vehicles for service and repair, are usually provided with safety legs to prevent accidental falling of the lift due to a failure of the hydraulic mechanism. Such safety legs, also serve to prevent rotation of the vehicle lift having a vehicle supported thereon.

Heretofore, vehicle lifts and other safety legs have been either manually operated or inclusive of various relatively complex mechanisms which, for numerous reasons, have been unreliable, inconvenient to operate, and have presented a safety hazard.

One of the more suitable automatic safety legs and non-rotators which has been used with vehicle lifts makes use of an elongated piston fitted in telescopic relation within a vertically disposed tubular casing and having a latching bar pivotally mounted on the piston and operative to hold the piston in a raised extended position relative to the tubular member. The latching bar is rotatably mounted in a diametric slot in the piston and has a center of gravity causing the bar to rotate naturally to a horizontal position perpendicular to the axis of the piston and extended to serve as a stop preventing the retraction of the piston within the tubular casing and falling of the lift. The latching bar is retracted by raising the piston slightly and having someone flip the latching bar into a vertical position such as enables the piston to be retracted within the tubular casing.

This type of safety leg latching mechanism is automatic only as regards the safety latching operation. The center of gravity of the latching bar is above and on one side of the pivotal axis thereof causing the bar to be in an unbalanced position as disposed within the slot of the piston. Accordingly, when the latching bar is free to assume a latching position it will do so automatically. However, as previously mentioned, the latching bar must be manually retracted and is therefore not fully automatic. Further, the manual unlocking of the safety leg exposes the operator to a safety hazard, chances damage to a vehicle on the lift if the lock on one of the pair of post lifts is forgotten, and requires considerable time and close attention to unlock the different safety legs; particularly where as many as five lifts may be used for tractor-trailer units.

It is an object of this invention to provide a fully automatic safety leg for use with vehicle lifts and the like.

It is an object of this invention to provide a safety leg for lifts which includes means automatically locking the legs, and accordingly the lifts, in a raised position and which will automatically and synchronously unlock such safety legs and allow the lift or lifts to be lowered.

It is also an object of this invention to provide a safety leg for vehicle lifts and the like which does not expose the operator to any safety hazard, chance any damage to a vehicle or the like raised on a pair or more of lifts for failure to unlock one thereof, and wherein the unlatching operation may be accomplished with a minimum of effort and time.

It is another object of this invention to provide a safety leg mechanism for vehicle and other lifts which, if desired, may be adapted to release or prevent one or more thereof from assuming an operative position and thereby enable a secondary latching means of like kind to be used.

It is a further object of this invention to provide a safety leg for lifts including means for preventing locking the lift in those instances where this may be desirable.

These and other objects and advantages to be gained in the practice of this invention will be more apparent upon a reading of the accompanying specification and with reference to the accompanying drawings.

In the drawings:

FIGURE 1 shows a power lift mechanism including the safety leg of this invention.

FIGURE 2 is an enlarged and partially cross section side view of the safety leg operative means of this invention.

FIGURE 3 is identical to FIGURE 2 with the safety leg latching and unlatching mechanism shown in different positions.

Figure 4:
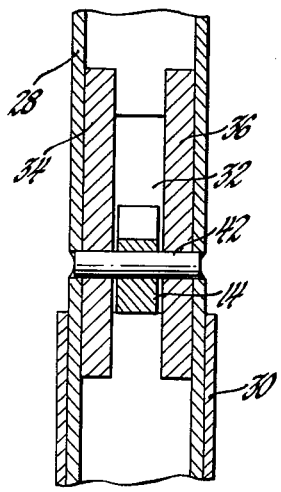
FIGURE 4 is a cross sectional view of the latching mechanism as seen in the plane of line 4—4 in FIGURE 2.

Generally speaking, the safety leg 10 of this invention, as used with a vehicle post lift 12, includes a latching bar 14 rotatably mounted within the inner disposed of two telescoping members which provide the safety leg 10. The latching bar 14 is formed to include a center of gravity which is at all times above and to one side or the other of the axis of rotation thereof, in a manner to be described, which assures having it assume a latching position when it is free to do so. Operative means 20 is provided on one of the telescoping members of the safety leg 10 and is disposed for actuation of the latching bar 14 for unlatching the safety leg and preventing latching thereof as will be described.

Referring to the drawings in further detail:

A single vehicle post lift 12 is shown by FIGURE 1. A piston 22 fitted in telescopic sliding relation within a cylinder 24 is adapted by conventional hydraulic mechanism to raise and lower a vehicle supporting frame 26. The cylinder 24 is usually disposed below the floor level and the vehicle supporting frame 26 is operated by injecting and withdrawing hydraulic fluid by conventional means which are not illustrated.

The safety leg 10 is intended to prevent the lift piston 22 from being unintentionally retracted into the cylinder 24 due to any failure in the hydraulic mechanism which might otherwise cause the lift to fall and seriously injure anyone under the lift or cause damage to a vehicle supported thereon. The safety leg also serves as a means for preventing undesirable rotation of the vehicle supporting frame 26.

The safety leg 10 usually includes a piston and cylinder arrangement similar to the lift post 12. However, as regards the present invention, the principal structural similarity is the provision of vertically disposed telescopic members 28 and 30. The larger tubular portion 30 is secured to the lift cylinder 24 and is disposed below the floor level. The smaller and inner telescoping member 28 is attached to the vehicle supporting frame 26 and, to this extent, is raised and lower with the frame upon actuation of the lift piston 22. Since the lower end of the telescopic member 28 is always engaged within the leg cylinder 30, the members also serve as a non-rotator in preventing rotation of the vehicle supporting frame 26.

Referring to FIGURE 2, it will be noted that the telescopic member 28 is provided with a diametric slot 32 near the lower end thereof and at a position which exposes the slot above the end of the cylinder 30 when the vehicle supporting frame 26 is in its normal vehicle supporting position. The safety leg piston 28 may be strengthened in the vicinity of the diametric slot 32 by members 34 and 36 welded into the tubular portion on each side of the slot.

The latching bar 14 is rotatably mounted on a pin 42 which extends transversely across the slot 32. The latching bar 14 may be rotated through an obtuse angle between a substantially horizontal position, as shown by FIGURE 2, and through a vertically disposed position to a slanted position substantially as shown by FIGURE 3. The latching bar 14 is of a size and shape to enable its opposite ends 44 and 46 to extend through the slot 32, when the bar is horizontally disposed, and to be engaged with the terminal end of the safety leg cylinder portion 30. As will be appreciated, in such position the latching bar prevents the telescopic member 28 from being retracted within the safety leg cylinder 30.

The larger end 46 of the latching bar 14 is formed to provide a center of gravity, identified as "X," which is on one side or the other and above the pivot pin 42 in all operative positions of the latching bar, as will subsequently be shown. It is also formed to include certain cam surfaces which will best be appreciated by reference thereto in the course of further discussion of the operation of the latching bar. It will be noted that one end of the slot 32 within which the latching bar 14 is disposed is cut higher at one side 48 than at the other side thereof. Accordingly, when the latching bar is in the position shown by FIGURE 3, the end 44 thereof is engaged with the slot defining wall and precludes the latching bar from flipping over. The center of gravity of the latching bar as disposed in the solid line position shown in FIGURE 3 is overcenter of the pivot pin 42 and serves to retain the latching bar in this position; if such position is assumed.

Figure 5:
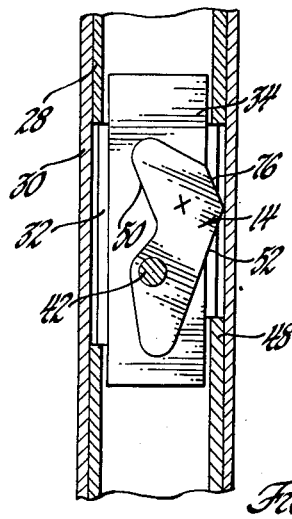
FIGURE 5 is a cross sectional view of the latching mechanism of the safety leg of this invention as disposed in a retracted position.

It the latching bar 40 is in either of the solid or phantom line positions shown by FIGURE 3, the safety leg piston 28 may be retracted within the cylinder 30. The cam surface 50 on the upper side of the latching bar 14 will engage the terminal end of the safety leg cylinder 30 as the piston is retracted and, due to the location of the center of gravity, dispose the latching bar in the recessed position shown by FIGURE 5. Similarly, if the latching bar 14 is in the phantom line position, its underside 52 will serve as a cam surface to accomplish the same result. In the latter instance, it will be noted that the end 44 of the latching bar is disposed within the safety leg piston 22 and will afford no interference with the retraction of the telescopic members in the nested relation.

The latching mechanism thus far described is automatic only in the sense of assuming a latched position. The latching bar must be flipped over into the reset position from whence it assumes the unlatched position in the course of retracting the telescopic members together. Before this can be accomplished the safety leg member 28 must be raised, as by hydraulic means operating the lift 12, to fully expose the slot 32 above the terminal end of the safety leg cylinder 30. Accordingly, the person operating the latching bar must expose himself to the dangers of a falling lift unprotected by the safety leg which he has unlatched. Furthermore, as previously mentioned, this must be done separately for each lift post, where multiple lift posts are used. If one of the latches is forgotten the vehicle may be tilted and dropped or, at least, time is lost to correct the error.

The unlatching means 20 incorporated with the safety leg 10 of this invention is best shown by FIGURES 2 and 3. The unlatching means 20 includes a bracket 54 which is secured to the safety leg cylinder 30 near the upper end thereof as by suitable bolt fastener means 56. The bracket 54 is formed to include an arm 58 having a lever 60 pivotally mounted thereon. The lever 60, in the present instance, is bell-crank in shape and has one end 62 thereof extended and disposed for engagement with the end 46 of the latching bar 14; when such latching bar is disposed in a safety leg latching position. The other end 64 of the lever is disposed for engagement by the plunger 66 of an air cylinder 68 mounted on an extended arm 70 of the bracket 54 and receptive thereof. A small spring 72 keeps the lever end 64 engaged with the air cylinder plunger 66 and, though other means are usually provided, assists in the retraction of the air cylinder plunger 66 when the air cylinder 68 is not charged. Air pressure is provided to the air cylinder 68 via conduit 74 which, as will be appreciated, may also be connected to similar air cylinder means operative of other unlatching means 20 incorporated with the safety leg 10 of other vehicle lift posts 12.

To inactivate the latching bar 14, the safety leg piston 28 is raised by the hydraulic mechanism operating the lift 12 to expose the slot 32 above the end of the safety leg cylinder 30 and enable the latching bar 14 to be rotated. In so doing, the cam surface 76 provided on the end 46 of the latching bar is disposed for engagement by the end 62 of the operating lever 60. Upon actuation of the air cylinder 68, the plunger 66 acting on lever end 64 raises the other end 62 and lifts the latching bar 14 into substantially the phantom position shown by FIGURE 3. As previously mentioned, the safety leg is inoperative with the latching bar in this position and the lift mechanism may be used to lower the lift.

It should also be appreciated that in the reverse operation of the lift, that is in raising the lift, the latching bar 14 will not assume a latching position if the lever end 62 is disposed in a raised position. As the latching bar 14 rotates through the slot 32, upon exposure thereof above the terminal end of the safety leg cylinder 30, the latching bar falls into engagement with the raised end of the lever 60 and is held in an inactive position.

Figure 6:
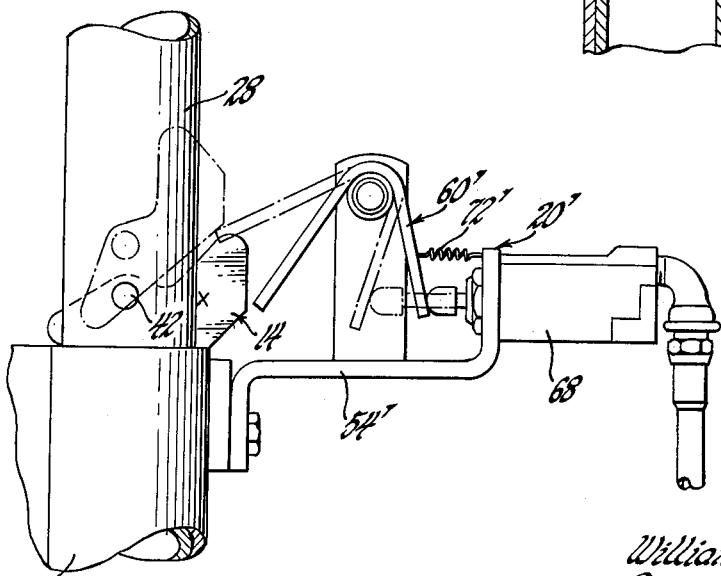
FIGURE 6 is a side view of a fragmentary part of a safety leg showing a modification of the unlatching mechanism taught by this invention.

The unlatching means 20' shown by FIGURE 6 makes use of a different type bracket 54' and a slightly different form of operating lever 60'. However, in essence, the mechanism is very similar in that the air cylinder 68 is secured to the bracket 54' and is operative thereof in the same manner as previously described. The return spring 72' is preferred even in this embodiment even though the form of the lever 60' reasonably assures continuous plunger engagement.

The preferred installation of the disclosed automatic safety leg includes having the latching and unlatching mechanism disposed below ground level in a protected and unobstructive location. A suitably disposed automatic control may be provided at a remote location to operate the air cylinder 68, either singularly or collectively on different lift posts. Accordingly, no one need be under the vehicle lifts when it is desired to raise, lower or adjust the lifts.

Although this invention has been discussed principally as regards vehicle lifts, and as regards hydraulically operated lifts inclusive of air operator means, it will be appreciated that this invention is not intended to be limited thereto and that it may be used as a safety mechanism with other apparatus and may be operated by air, hydraulic, Bowden wire or other means.

We claim:

1. An automatic safety leg for vehicle lifts and the like, comprising: vertically disposed telescoping piston and cylinder members, said telescopic piston member having a diametric slot provided therethrough, a latching bar pivotally mounted and rotatable within said slot, said latching bar being of a width retractable with said piston member as vertically disposed and of a length exposing opposite ends thereof through said slot as horizontally disposed for stop abutment with the terminal end of said cylinder member, said latching bar having one end thereof inclusive of the center of gravity at a position above and to one side of the axis of rotation therefor, said slot being formed through one side of said piston member to permit rotation of the other end thereof within said piston member and to preclude rotation through the other side thereof for preventing said latching bar from flipping over, said latching bar including cam surfaces operative thereof into vertically disposed positions permissive of retraction of said latching bar with said piston member into said cylinder member, and remotely controlled operative means provided on the upper end of said cylinder member separate and apart from said telescoping members for selective actuation of said latching bar, said operative means including a bell crank lever having one end disposed for lifting engagement with an operative cam surface of said latching bar and retraction positioning of said latching member, means engaging and biasing said lever against engagement with said latching bar, and a power operated reciprocal member engaged with the other end of said bell crank lever for overcoming said biasing means and effecting lever engagement with said latching bar, said latching bar having the lift operative cam surface thereof inaccessibly disposed while in a safety leg latching position and accessibly disposed only upon elevation of said telescoping members for such purpose.

2. Operative means for use with vehicle lifts including telescoping members providing a safety leg and having a gravity actuated latching bar for locking engagement therebetween, said means comprising: a mounting bracket, means for attaching said bracket to one of said telescoping members, a bell crank lever pivotally mounted on said bracket and disposed for engagement with the latching bar of said safety leg, means biasing said lever in a retracted position precluding latching bar engagement, and remotely controlled power operated means provided on said bracket and engaged with one end of said bell crank lever for actuation thereof overcoming said biasing means and affecting lever engagement of said latching bar, said bracket being attached to said one telescoping member for disposing said lever arm for actuating engagement with said latching bar only as disposed in an elevated and unseated position.

References Cited in the file of this patent
UNITED STATES PATENTS

| | | |
|---|---|---|
| 2,608,381 | Pelouch | Aug. 26, 1952 |
| 2,684,129 | Jaseph | July 20, 1954 |
| 2,954,100 | Harr | Sept. 27, 1960 |
| 2,956,643 | Halstead | Oct. 18, 1960 |
| 2,956,644 | Green | Oct. 18, 1960 |